US012638055B2

(12) United States Patent
Frisch et al.

(10) Patent No.:  US 12,638,055 B2
(45) Date of Patent:       May 26, 2026

(54) SHAFT-HUB CONNECTION WITH A SPLINE TOOTHING

(71) Applicants: AUDI AG, Ingolstadt (DE);
Volkswagen AG, Wolfsburg (DE)

(72) Inventors: Michael Frisch, Schoenberg (DE);
Johannes Albl, Ingolstadt (DE);
Wolfgang Heise, Wolfsburg (DE)

(73) Assignees: AUDI AG, Ingolstadt (DE);
**VOLKSWAGEN
AKTIENGESELLSCHAFT**,
Wolfsburg (DE)

( * ) Notice: Subject to any disclaimer, the term of this
patent is extended or adjusted under 35
U.S.C. 154(b) by 519 days.

(21) Appl. No.: 18/248,952

(22) PCT Filed: Oct. 13, 2021

(86) PCT No.: PCT/EP2021/078302
§ 371 (c)(1),
(2) Date: Apr. 13, 2023

(87) PCT Pub. No.: WO2022/079097
PCT Pub. Date: Apr. 21, 2022

(65) Prior Publication Data
US 2024/0068523 A1      Feb. 29, 2024

(30) Foreign Application Priority Data
Oct. 13, 2020    (DE) ..................... 10 2020 126 843.2

(51) Int. Cl.
F16D 1/10          (2006.01)
B60B 27/00       (2006.01)

(52) U.S. Cl.
CPC .......... F16D 1/101 (2013.01); B60B 27/0026
(2013.01); F16D 2001/103 (2013.01); **Y10T
403/7035** (2015.01)

(58) Field of Classification Search
CPC ..... B60B 27/0026; B60B 35/121; F16D 1/10;
F16D 1/101; F16D 2001/103;
(Continued)

(56) References Cited

U.S. PATENT DOCUMENTS 4,875,796 A     10/1989   Storm
6,702,508 B2 *   3/2004   Simons ................... F16D 1/101
403/359.2
(Continued)

FOREIGN PATENT DOCUMENTS

CN             1678839 A     10/2005
CN          106257098 A     12/2016
(Continued)

OTHER PUBLICATIONS

English Translation of Iprp (PCT/IB/338 and PCT/IB/373) (Apr. 27,
2023, Apr. 13, 2023) and the Written Opinion of ISA (PCT/ISA/
237) issued in International Application No. PCT/EP2021/078302
dated Jan. 14, 2022 (7 pages).
(Continued)

*Primary Examiner* — Josh Skroupa
(74) *Attorney, Agent, or Firm* — STAAS & HALSEY
LLP

(57) ABSTRACT

A shaft-hub connection includes a shaft and a hub which
engage with one another for conjoint rotation about an axis
of rotation via a first toothing and a second toothing. The
first toothing has a first toothing region and a second
toothing region, wherein the first toothing region and the
second toothing region are, as viewed in the circumferential
direction (u), arranged offset by a dimension (d) in such a
way that the first toothing region engages with the second
toothing via front tooth flanks as viewed in the circumfer-
ential direction (u), and the second toothing region engages
(Continued)

with the second toothing via rear tooth flanks as viewed in the circumferential direction (u).

12 Claims, 5 Drawing Sheets

(58) Field of Classification Search
CPC ..... F16D 2003/22326; Y10T 403/7026; Y10T 403/7028; Y10T 403/7031; Y10T 403/7032; Y10T 403/7033; Y10T 403/7035
USPC ......... 403/359.1, 359.2, 359.3, 359.4, 359.5, 403/359.6
See application file for complete search history.

(56) References Cited

U.S. PATENT DOCUMENTS

| | | | | |
|---|---|---|---|---|
| 8,286,525 | B2 * | 10/2012 | Okabe ................. | F16H 57/0025 |
| | | | | 74/451 |
| 10,234,011 | B2 | 3/2019 | Meffert et al. | |
| 11,428,158 | B2 | 8/2022 | Daimer et al. | |
| 2005/0254890 | A1 | 11/2005 | Schulz et al. | |
| 2008/0141812 | A1 * | 6/2008 | Okabe ................. | F16H 57/0025 |
| | | | | 72/108 |
| 2018/0135703 | A1 | 5/2018 | Ponikiewski et al. | |

FOREIGN PATENT DOCUMENTS

| | | | | | |
|---|---|---|---|---|---|
| CN | 109072983 | A | | 12/2018 | |
| DE | 43 02 726 | C2 | | 2/1993 | |
| DE | 102013019727 | A1 | * | 5/2015 | ............. F16D 1/108 |
| DE | 102017220457 | A1 | * | 5/2019 | ............. F16D 1/116 |
| DE | 102017129620 | A1 | * | 6/2019 | ............. F16D 1/108 |
| EP | 0 318 266 | B1 | | 8/1991 | |
| JP | 03129157 | A | * | 6/1991 | .............. F16D 1/06 |
| JP | 2001003947 | A | * | 1/2001 | ............. F16D 1/108 |
| JP | 2009214804 | A | * | 9/2009 | .............. F16D 1/02 |
| JP | 2013122266 | A | * | 6/2013 | ............. F16D 1/104 |
| JP | 2016-020718 | | | 2/2016 | |
| JP | 2018087601 | A | * | 6/2018 | ............. F16D 1/108 |
| WO | WO-2017125259 | A1 | * | 7/2017 | .............. F16D 1/10 |

OTHER PUBLICATIONS

International Search Report issued in International Application No. PCT/EP2021/078302 dated Jan. 14, 2022.

Written Opinion issued in International Application No. PCT/EP2021/078302 dated Jan. 14, 2022.

German Examination Report issued in German Application No. 10 2020 126 843.2 dated Aug. 30, 2021.

Chinese Office Action dated Aug. 1, 2025 from Chinese Patent Application No. 202180069983.2, with English translated Summary of Chinese Office Action Partial.

* cited by examiner 16-1          16-2

14

SHAFT-HUB CONNECTION WITH A SPLINE TOOTHING

CROSS-REFERENCE TO RELATED APPLICATIONS

This application is a 35 USC 371(a) National Stage of International Application PCT/EP2021/078302, filed Oct. 13, 2021, which claims priority to German application 10 2020 126 843.2, filed Oct. 13, 2020, the disclosures of which are incorporated herein by reference in their entireties.

BACKGROUND

1. Field

The examples describing an invention relate to a shaft-hub connection.

2. Description of Related Art

Different embodiments of shaft-hub connections for the transmission of torque are known from the prior art. In motor vehicles, the shaft-hub connection for transmitting the torque from the drive shaft to the wheel hub is generally designed as a splined-shaft connection, with the drive shaft and the wheel hub being non-positively connected to one another by a screw assembly, cf. DE 43 02 726 C2.

The shaft, which has external toothing, is usually inserted axially into the wheel hub, which has internal toothing, resulting in the shaft and hub being in rotary drive engagement via the intermeshing external and internal toothing. In this case, the external toothing of the shaft and the internal toothing of the hub form a positive-locking spline.

Splines are often designed as transition fits, i.e. even with new splines, depending on the tolerance fit present, there may be circumferential backlash between the tooth flanks of the shaft toothing and the tooth flanks of the hub toothing. However, circumferential backlash can also occur as the toothing is run in over the first thousand operating kilometers of the motor vehicle, due to the reduction of shape defects. Circumferential backlash, i.e. the relative movement made possible between the tooth flanks of the shaft toothing and the hub toothing, and the resulting abrupt impact of the teeth on one another, may result in the generation of undesirable acoustic effects. This undesired noise is also referred to as ping noise or starting cracking.

In particular, if slipping also occurs in the opposite direction when reversing, or as a result of thrust torques, such as those generated by electric vehicles in recuperation mode, these noises can occur repeatedly. The trend toward higher wheel torques (large wheels, large engine torques) and recuperation in electric vehicles will exacerbate this problem in the future.

To avoid these undesirable noises, EP 0 318 266 B1 discloses a splined-shaft connection in which the tooth flanks of the shaft toothing or the tooth flanks of the hub toothing are sinusoidally corrugated so that the tooth flanks of the shaft and hub toothings are in clamped engagement with one, i.e. they mesh without backlash. One disadvantage here is that the sinusoidal design of the tooth flanks is complex to manufacture and therefore involves high production costs. Another disadvantage is the small contact surface area between the tooth flanks due to the sinusoidal design of the tooth flanks of the shaft or hub teeth.

SUMMARY

In an example, a shaft-hub connection may be improved in such a way that the occurrence of undesirable noises such as starting cracking or ping noise may be avoided.

An example may be accomplished by the characterizing features recited in the claims including the dependent claims.

In a known manner, the shaft-hub connection comprises a shaft and a hub which engage with one another for conjoint rotation about a common axis of rotation via a first toothing and a corresponding second toothing.

For the sake of completeness only, it is noted that the components in meshing engagement via the first and second toothing, i.e. shaft and hub, are arranged in an axially overlapping manner in the tooth engagement region. The axially overlapping arrangement of shaft and hub in the tooth engagement region must be designed in such a way that, viewed in the radial direction r, an arrangement in which the shaft is radially on the inside and the hub is radially on the outside, and an arrangement in which the hub is radially on the inside and the shaft is radially on the outside, are both encompassed.

It is also noted that the phrase "toothing" is to be understood in particular as meaning that the first and second toothing, viewed in the circumferential direction u, have a plurality of teeth whose tooth flanks extend rectilinearly, for example, parallel to the axis of rotation.

According to an example, the first toothing has a front toothing region—hereinafter also referred to as the first toothing region—as viewed in the axial direction a, and a rear toothing region—hereinafter also referred to as the second toothing region—as viewed in the axial direction a. As viewed in the circumferential direction u, the first and second toothing regions of the first toothing are arranged offset by a dimension d in such a way that the teeth of the teeth of first toothing region of the first toothing engage via the front tooth flanks with the second toothing, as viewed in the circumferential direction u, while the teeth of the second toothing region of the first toothing engage via the rear tooth flanks with the second toothing, as viewed in the circumferential direction u.

In an example, an effect may be that the offset of the two toothing regions of the first toothing relative to one another and the resulting selective tooth flank engagement, namely engagement of the first toothing region via the front tooth flanks of the teeth and engagement of the second toothing region via the rear tooth flanks of the teeth, will cause the first and second toothings to be clamped in place in the circumferential direction, thus resulting in zero backlash.

Because there is zero backlash, this now advantageously ensures that there will no longer be a relative movement between shaft and hub, with the result that the occurrence of undesirable noises resulting essentially from a relative movement between shaft and hub, such as starting cracking or ping noise, is successfully prevented. Another advantage is that, compared with the prior art of EP 0 318 266 B1, the shaft or hub toothings are in contact over larger contact surfaces, and the rectilinear tooth flank allows a simplified and thus more cost-effective production.

As initial tests have shown, the dimension d by which the two toothing regions of the first toothing are offset relative to one another in the circumferential direction u should, for example, be selected such that $$5 \ \mu m < \text{dimension } (d) < 0.5 \text{ m},$$

where m is the module of the first toothing.

In an example, the axial length L1 of the front or first toothing region of the first toothing, as viewed in the axial direction a, is dimensioned such that, referring to the total axial length of the first toothing (hereinafter referred to as L) the following applies to the axial length L1 of the first toothing region:

$$\text{axial length } L1/\text{axial length } L > 0.5.$$

This means that the axial length L1 of the front toothing region, as viewed in the axial direction a or in the joining direction, is greater than the axial length L2 of the rear toothing region, as viewed in the joining direction.

This advantageously may ensure that the shaft and hub can be joined with clearance over the larger part of the toothing, namely the front or first toothing region. This proves to be advantageous with regard to assembly, as it enables facilitated threading by hand over a long region, meaning that joining may only be carried out for the subsequent smaller region by mechanical aids, for example by tightening a central screw.

In order to prevent jamming during the joining process of shaft and hub, the first and second toothing regions are, for example, connected to each other via a third toothing region that serves as a guide. More specifically, the first toothing is designed in the manner of an S-shaped toothing, i.e. in three parts, namely having a first and second toothing region as well as a third toothing region that is arranged between the first and second toothing regions, as viewed in the axial direction a.

In an example, the axial length L3 of the third toothing region that serves as a guide is dimensioned in such a way that the following applies with respect to the axial length L of the first toothing:

$$0.05 \leq \text{axial length } L3/\text{axial length } L \leq 0.33.$$

The relatively short length of the third toothing region advantageously may ensure that the first toothing is in rotary drive engagement over almost the entire toothing length, namely L1 and L2. This in turn has the effect that, due to the resulting high contact ratio of the toothing, the first toothing can be made relatively short, which brings additional weight and cost advantages.

An alternative example of the first toothing, which is less complex to manufacture, provides for the first and second toothing regions to be separated from each other via an undercut. To ensure easy, non-jamming joining in this case as well, the teeth of the second toothing region, i.e. the teeth of the rear toothing region, as viewed in the axial direction a or in the joining direction, have a threading tip on their tooth edge facing the first toothing region.

In order to ensure the longest possible toothing length of the first toothing, which may include the first and second toothing regions, the undercut is designed to be as small as possible in its axial length L4, in particular in such a way that $$\text{axial length } L4/\text{axial length } L \leq 0.33,$$

where L4 is the axial length of the undercut and L is the axial length of the first toothing.

This in turn advantageously may allow a high contact ratio of the first toothing and thus a weight-reduced and cost-effective design.

In an example first embodiment of a shaft-hub connection, the shaft has the first toothing, while the second toothing, which meshes with the first toothing, is formed on the hub.

A first example of the example first embodiment provides for the shaft toothing constituting the first toothing to be in the form of external toothing of the shaft and, correspondingly, the hub toothing constituting the second toothing to be in the form of internal toothing of the hub. This means that in the axial overlap area of shaft and hub, i.e. in the tooth engagement region, in this case the shaft is arranged radially on the inside and the hub is arranged radially on the outside, as viewed in the radial direction r. The first toothing, i.e. the toothing having the toothing regions, in the form of external toothing advantageously may ensure facilitated and cost-effective production.

An alternative second example of the example first embodiment provides for the shaft toothing constituting the first toothing to be in the form of internal toothing of the shaft and, correspondingly, the hub toothing constituting the second toothing to be in the form of external toothing of the hub. In other words, in the tooth engagement region, i.e. in the axial overlapping area of the shaft and the hub, the hub is arranged radially on the inside and the shaft is arranged radially on the outside, as viewed in the radial direction r.

In the second example of the example first embodiment of the shaft-hub connection, which may be advantageous, e.g. for reasons of packaging or with regard to specific installation space requirements, provides for an arrangement of the first and second toothing which is reversed with respect to the first example of the first embodiment: i.e., the first toothing having the toothing regions is formed on the hub and the second toothing in engagement with the first toothing is formed on the shaft.

According to the second example of the first embodiment, the hub toothing forming the first toothing is formed as an external toothing of the hub and, correspondingly, the second toothing meshing with the hub toothing is formed as an internal toothing of the shaft. In relation to the axial overlap region of shaft and hub, i.e. in the tooth meshing region, this in turn means that, viewed in the radial direction r, the hub is arranged radially on the inside and the shaft is arranged radially on the outside.

According to the alternative second example of the example first embodiment, it is also conceivable to form the hub toothing constituting the first toothing in the form of internal toothing of the hub and correspondingly to form the shaft toothing meshing with the first toothing and constituting the second toothing in the form of external toothing of the shaft. More precisely, in this second example of the example first embodiment, as viewed in radial direction r, the shaft is arranged radially on the inside and the hub is arranged radially on the outside in the axial overlap region of shaft and hub, i.e. in the tooth engagement region.

In an example, the shaft-hub connection may be used for torque transmission in the drive train of a motor vehicle, i.e. the shaft is, for example, a drive shaft driving a wheel of a motor vehicle and, correspondingly, the hub is, for example, a wheel hub rotatably supporting the wheel.

It an example, a motor vehicle as recited in the claims may be improved in such a way that the occurrence of undesirable noises when starting or following load changes is avoided.

In a known manner, the driven wheels of the motor vehicle are each connected to one another for conjoint rotation via a shaft-hub connection formed between an axle journal of a drive shaft and an associated wheel hub.

The examples now provide for the shaft-hub connection as recited in the claims.

What has been said above regarding the shaft-hub connection according to the described examples can be applied analogously to the motor vehicle according to the described examples, so that the advantages mentioned above can be achieved with it.

Additional advantages and possible applications of the described examples of the present invention will be apparent from the description which follows, in which reference is made to the examples illustrated in the drawings.

BRIEF DESCRIPTION OF DRAWINGS

These and other aspects and advantages will become more apparent and more readily appreciated from the following description of the examples, taken in conjunction with the accompanying drawing of which.

DESCRIPTION

Figure 1:
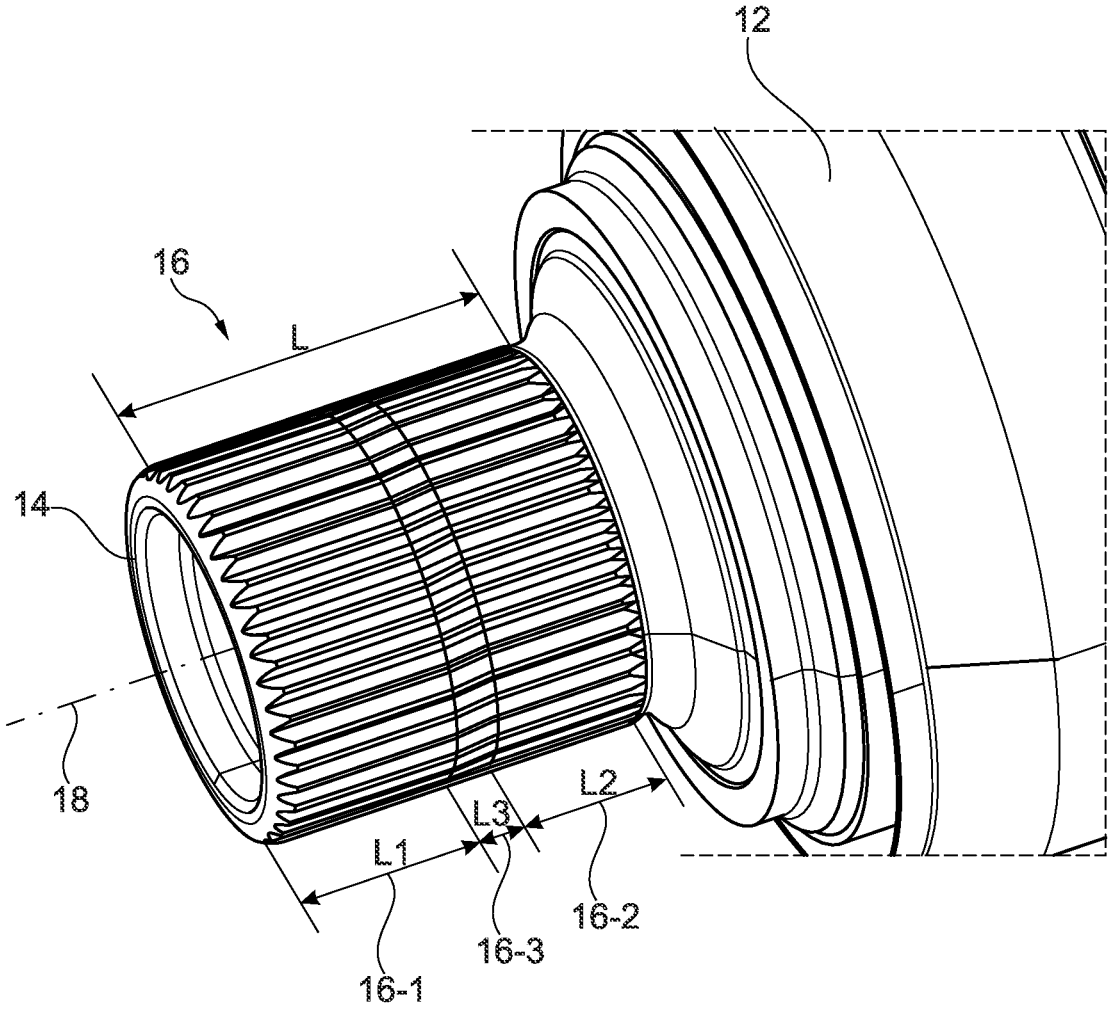
FIG. 1 is a view of an example first embodiment of a shaft of the shaft-hub connection according to an example.
Figure 2:
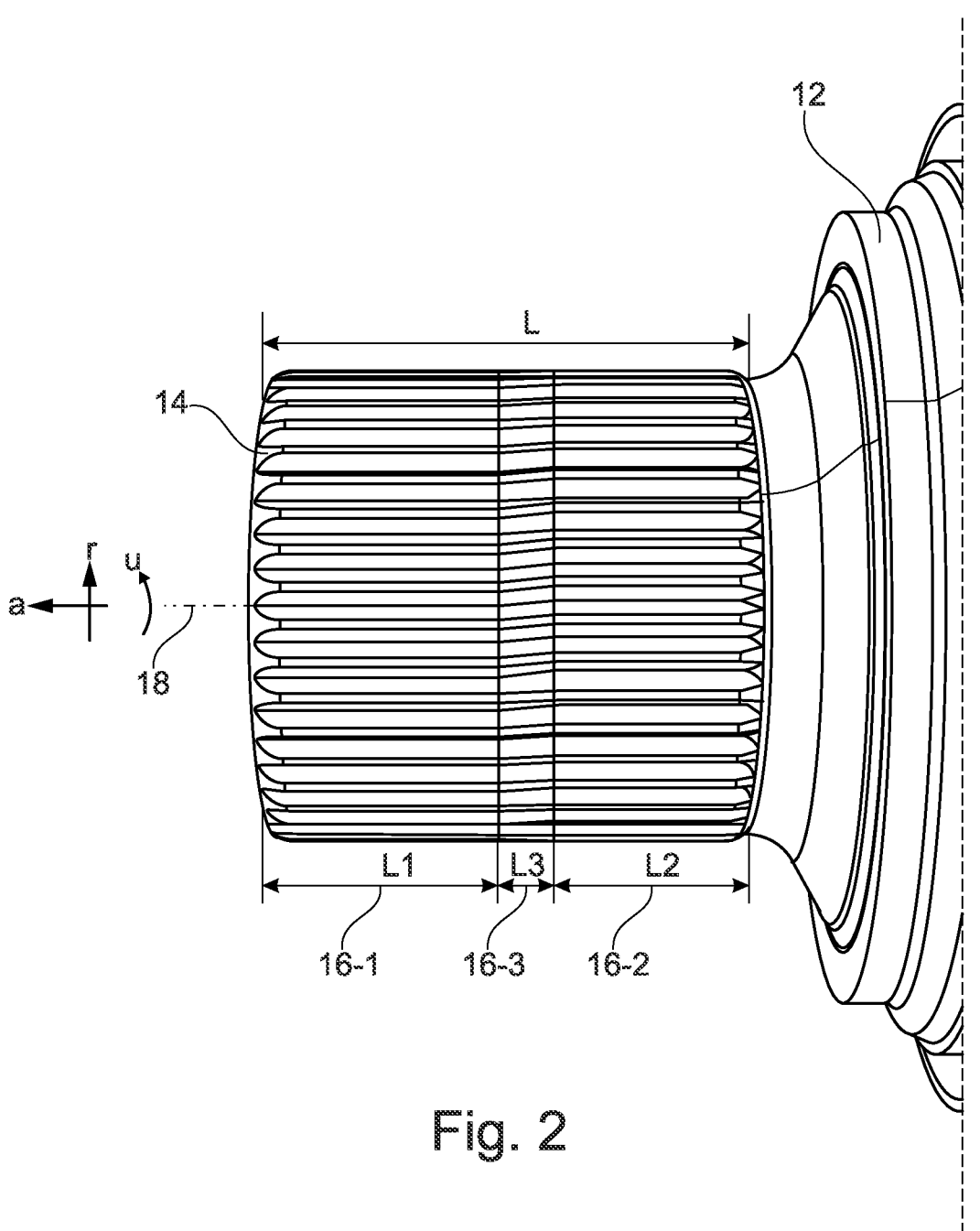
FIG. 2 is an enlarged view of the axle journal of the shaft of FIG. 1.
Figure 3:
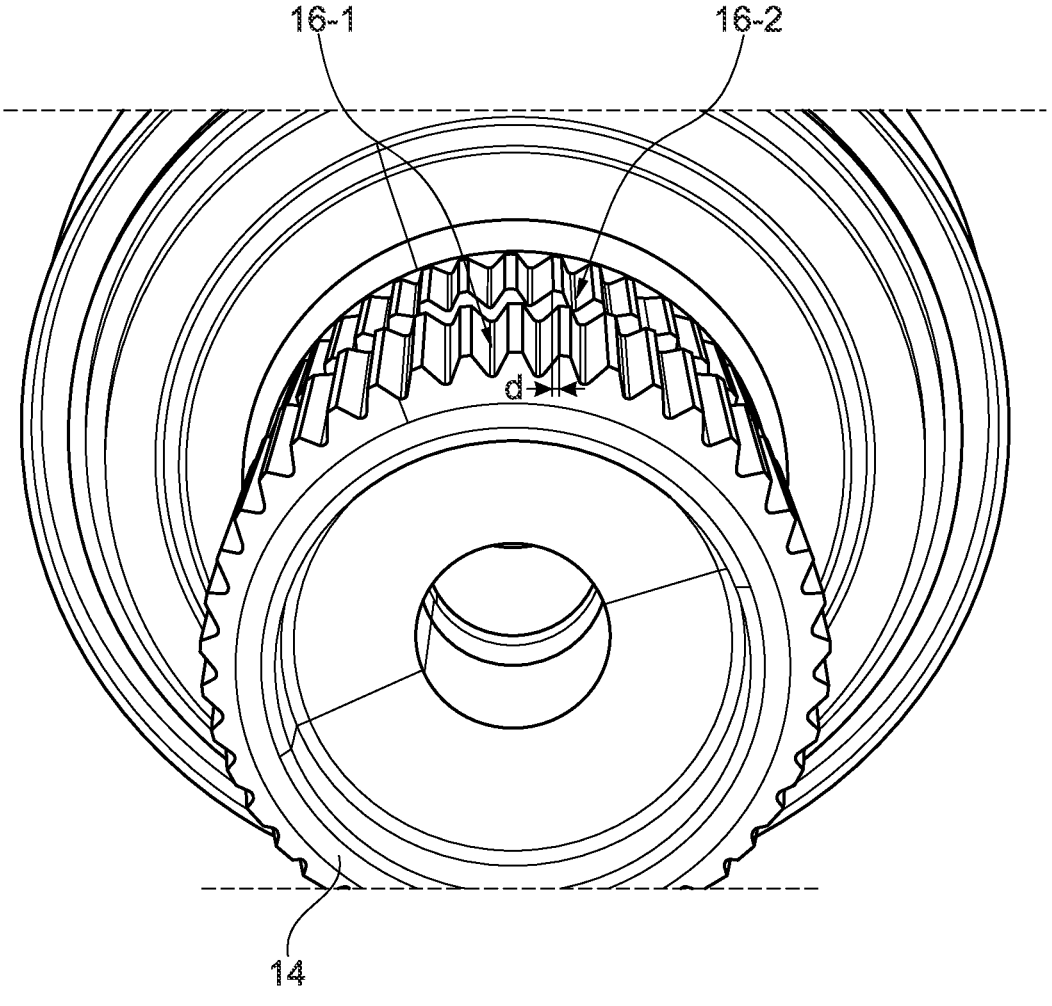
FIG. 3 is a view of the axle journal of FIG. 2, taken at an angle from the front.

FIGS. 1 to 3 are views of an example first embodiment of a shaft 12 of a shaft-hub connection according to an example.

In a known manner, the shaft 12 comprises an axle journal 14 which has first toothing 16 formed as circumferential external toothing.

Accordingly, the hub itself—which is not shown here for reasons of clarity—has second toothing in the form of circumferential inner toothing. The teeth of the second toothing, which is designed as internal toothing, are aligned in a rectilinear manner, extending parallel to the axis of rotation 18.

The first toothing 16, i.e. the external toothing 50 of the shaft 12, and the second toothing 36, i.e. the internal toothing 60 of the hub 30, are formed in such a way that, after inserting the axle journal 14 into the hub 30, the first toothing 16 is in meshing engagement with the second toothing 36, so that shaft 12 and hub 30 are connected to each other for conjoint rotation about the axis 18 of rotation.

Since—as already explained—the first toothing 16 may be an external toothing of the shaft 12 or of the axle journal 14 of the shaft 12, and the second toothing may be an internal toothing of the hub, and thus the axle journal 14 is to be axially inserted or pushed into the hub for joining, after joining the shaft 12 and hub in the axial overlap region of the shaft and hub, i.e. in the tooth engagement region, the axle journal 14 of the shaft 12 will be arranged radially on the inside and the hub will be arranged radially on the outside, as viewed in the radial direction r.

As can further be seen from FIG. 1 and FIG. 2, the first toothing 16 of the axle journal 14, which is formed as external toothing, in particular has two toothing regions with teeth—formed corresponding to the second toothing (internal toothing of the hub)—that extend rectilinearly and parallel to the axis 18 of rotation, namely a front toothing region, as viewed in axial direction a, hereinafter also referred to as first toothing region 16-1, and a rear toothing region, as viewed in axial direction a, hereinafter also referred to as second toothing region 16-2. In FIG. 1 and FIGS. 2, L, L1 and L2 denote the axial lengths of the toothing 16 and the toothing regions 16-1, 16-2, respectively. More specifically, viewed in the axial direction a, the first toothing 16 has the axial length L; correspondingly, the first toothing region 16-1 has the axial length L1 and the toothing region 16-2 has the axial length L2.

As can be further seen from FIG. 1 and FIG. 2, the first toothing region 16-1 has a length L1 that is greater than the length L2 of the second toothing region 16-2.

In addition, the teeth of the first toothing region 16-1, which extend in a rectilinear manner and parallel to the axis 18 of rotation, and the teeth of the second toothing region 16-2, which extend in a rectilinear manner and parallel to the axis 18 of rotation, are arranged offset in the circumferential direction u by a dimension d, cf. FIG. 3.

In this case, the dimension d is selected in such a way that, after inserting the shaft 12 or the axle journal 14 into the hub 30, the teeth of the first toothing region 16-1 will be in engagement with the second toothing 36, i.e. the internal toothing of the hub 30, via their front tooth flanks 26-1 as viewed in the circumferential direction u, and the teeth of the second toothing region 16-2 will be in engagement with the second toothing 36, i.e. the internal toothing of the hub 30, via their rear tooth flanks 26-2 as viewed in the circumferential direction u.

The selective tooth flank engagement, namely engagement of the teeth of the first toothing region 16-1 via the front tooth flanks 26-1, as viewed in the circumferential direction u, and engagement of the teeth of the rear toothing region 16-2 via the rear tooth flanks 26-2, as viewed in the circumferential direction u, cause the first and second toothing 36 to be braced in the circumferential direction u, and as a result, there is zero backlash.

The absence of backlash in turn has the effect that there cannot be any relative movement between shaft 12 and hub, so that the occurrence of noises resulting from undesirable relative movements between shaft 12 and hub, such as starting cracking or ping noise, is successfully prevented.

Moreover, as shown in particular in FIG. 1 and FIG. 2, in order to avoid jamming during the joining process of shaft 12 and hub, the first and second toothing regions 16-1, 16-2 of the first toothing 16 are connected to each other via a third toothing region 16-3, which serves as a guide and is arranged between the first and second toothing regions 16-1, 16-2, as viewed in the axial direction a. The axial length of the third toothing region 16-3 is designated L3, cf. FIG. 1 and FIG. 2.

Since the axial length L1 of the first toothing region 16-1 is already greater than the axial length L2 of the second toothing region 16-1, the toothing regions to be joined first during assembly, namely the first toothing region 16-1 and the adjoining third toothing region 16-3, together are correspondingly greater than the axial length L2 of the second toothing region 16-2. This thus advantageously allows simplified "threading" by hand during assembly over the relatively large region L1+L3, so that joining by mechanical aids, for example by tightening a central screw, only has to be carried out in the area of the subsequent smaller region L2.

Since the third toothing region 16-3, which only serves as a guide, does not contribute to the contact area ratio of the first toothing 16, it should be designed as short as possible. As regards the total length L of the first toothing, the total length L may, for example, be in such a way that $$0.05 \leq \text{axial length } L3/\text{axial length } L \leq 0.33.$$

Figure 4:
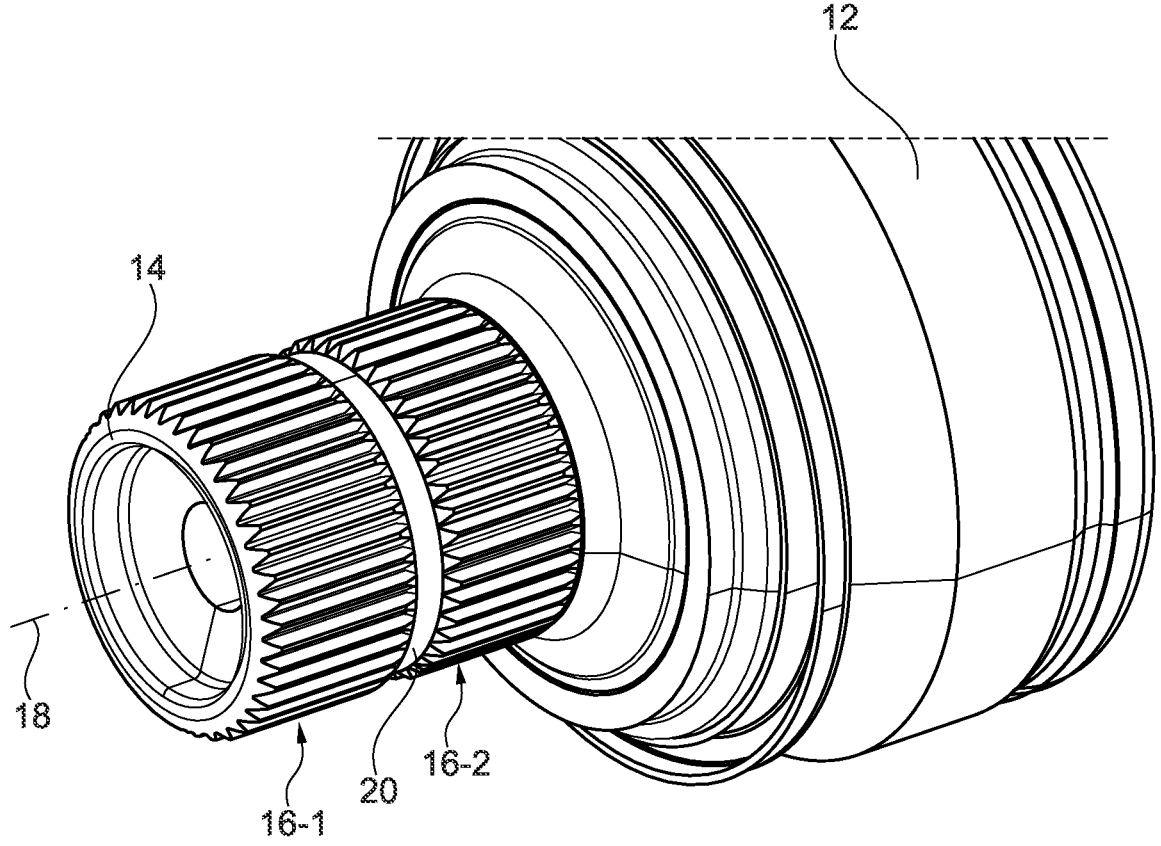
FIG. 4 is a view of an example second embodiment of a shaft of the shaft-hub connection according to an example.
Figure 5:
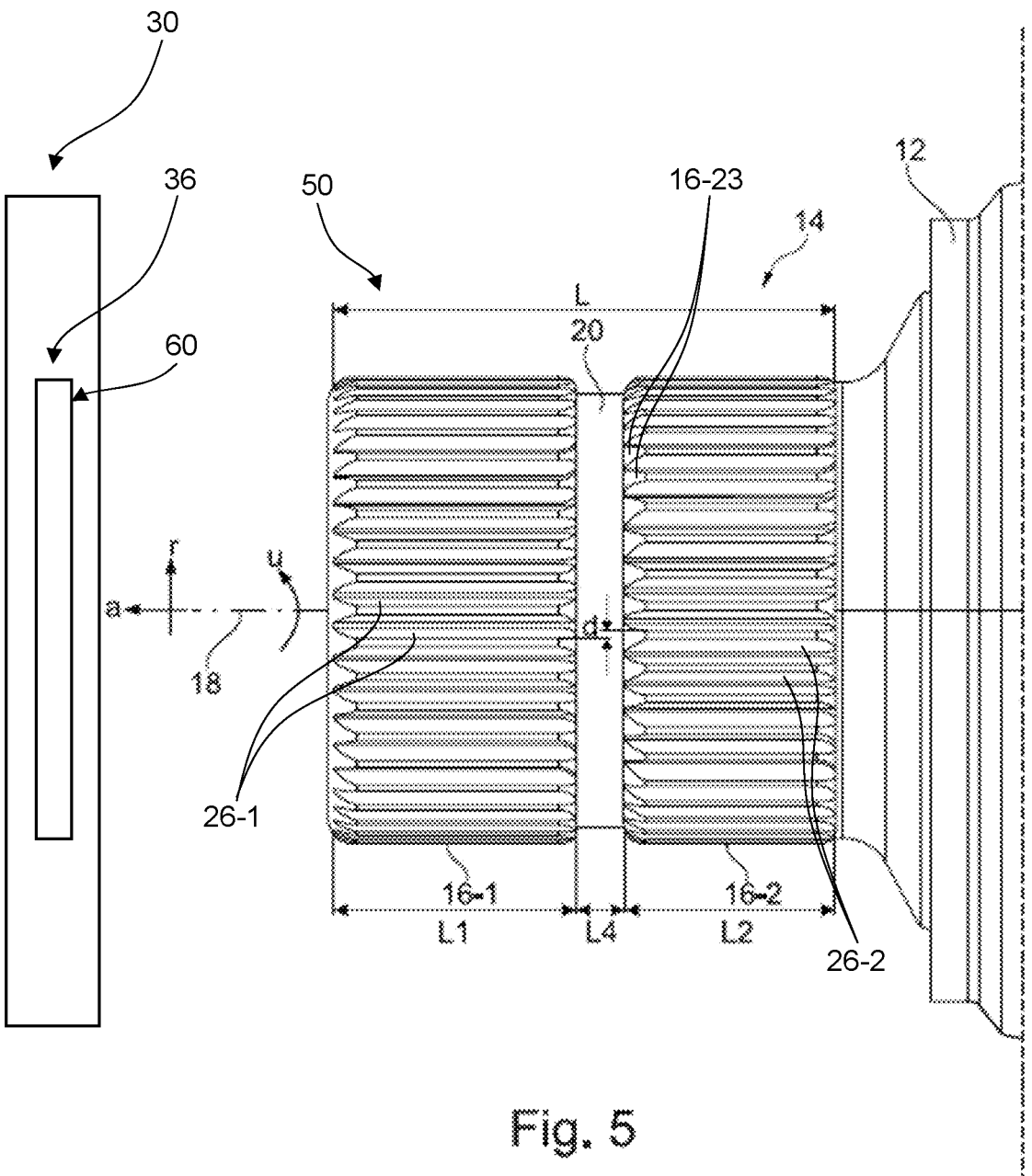
FIG. 5 is an enlarged view of the axle journal of the shaft of FIG. 4.

An example second embodiment of the shaft 12 is shown in FIGS. 4 and 5. The shaft 12 according to the example second embodiment corresponds essentially to the shaft 12 according to the example first embodiment as shown in FIGS. 1 to 3 and already described above. Therefore, to avoid repetition, reference is made to what has been stated above.

The shaft 12 shown in FIGS. 4 and 5 differs from the shaft 12 according to the example first embodiment in that the toothing regions 16-1 and 16-2, which are offset by the dimension d as viewed in the circumferential direction u, are separated from each other by an undercut 20. The axial length of the undercut is designated L4, cf. FIG. 5.

Since the undercut does not contribute to the contact ratio of the first toothing, the undercut 20 should again be as small as possible.

In an example, the axial length L4 of the undercut 20 is dimensioned in such a way that the following applies with respect to the axial length L of the first toothing 16:

$$\text{axial length } L4/\text{axial length } L \leq 0.33.$$

The advantage of this example second embodiment may be that—due to the omission of the third toothing region—it may be possible to manufacture the product in a less complex and thus more cost-effective manner as compared to the first embodiment.

In order to enable a jamming-free joining process of shaft 12 and hub also in the "undercut" design, the teeth of the second toothing region 16-2 are for example provided with a threading tip 16-23.

A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in *Superguide* v. *DIRECTV*, 358 F3d 870, 69 USPQ2d 1865 (Fed. Cir. 2004).

The invention claimed is:

1. A shaft-hub connection, comprising:
a shaft; and
a hub,
wherein the shaft and the hub are connectable through a first toothing and a second toothing to form the shaft-hub connection such that, with the shaft and the hub connected through the first toothing and the second toothing, the shaft and the hub are conjointly rotatable about an axis of rotation,
the first toothing has a first toothing region and a second toothing region that are separated by an undercut,
the first toothing region and the second toothing region are offset by a dimension (d) in a circumferential direction (u) of the shaft-hub connection such that, with the shaft and the hub connected through the first toothing and the second toothing, the first toothing region is engaged with the second toothing through front tooth flanks of the first toothing region in the circumferential direction (u),
the second toothing region is engaged with the second toothing through rear tooth flanks of the second toothing region in the circumferential direction (u), and
an axial length of the undercut (L4) in an axial direction of the shaft-hub connection divided by an axial length of the first toothing (L) in the axial direction is less than or equal to 0.33.

2. The shaft-hub connection of claim 1, wherein the dimension (d) is greater than 5 μm and less than half of a width of a tooth of the first toothing in the circumferential direction (u).

3. The shaft-hub connection of claim 1, wherein an axial length of the first toothing region (L1) in an axial direction of the shaft-hub connection divided by an axial length of the first toothing (L) in the axial direction is greater than 0.5.

4. The shaft-hub connection of claim 1, wherein teeth of the second toothing region have a threading tip on an edge facing the first toothing region that includes a surface that is inclined in an axial direction of the shaft-hub connection.

5. The shaft-hub connection of claim 1 wherein
the shaft has the first toothing and the hub has the second toothing, and
the first toothing includes external toothing of the shaft and the second toothing includes internal toothing of the hub, or the first toothing includes internal toothing of the shaft and the second toothing includes external toothing of the hub.

6. The shaft-hub connection of claim 1 wherein
the hub has the first toothing and the shaft has the second toothing, and
the first toothing includes external toothing of the hub and the second toothing includes internal toothing of the shaft, or the first toothing includes internal toothing of the hub and the second toothing includes external toothing of the shaft.

7. A motor vehicle, comprising:
a drive shaft including an axle journal; and
a wheel hub connected to the axle journal through a shaft-hub connection such that the drive shaft and wheel hub are conjointly rotatable, the shaft-hub connection including:
a shaft, and
a hub,
wherein the shaft and the hub are connected by engagement through a first toothing and a second toothing to form the shaft-hub connection such that the shaft and the hub are conjointly rotatable about an axis of rotation,
the first toothing has a first toothing region and a second toothing region that are separated by an undercut,
the first toothing region and the second toothing region are offset by a dimension (d) in a circumferential direction (u) of the shaft-hub connection such that the first toothing region is engaged with the second toothing through front tooth flanks of the first toothing region in the circumferential direction (u),
the second toothing region is engaged with the second toothing through rear tooth flanks of the second toothing region in the circumferential direction (u), and
an axial length of the undercut (L4) in an axial direction of the shaft-hub connection divided by an axial length of the first toothing (L) in the axial direction is less than or equal to 0.33.

8. The motor vehicle of claim 7, wherein the dimension (d) is greater than 5 μm and less than half of a width of a tooth of the first toothing in the circumferential direction (u).

9. The motor vehicle of claim 7, wherein an axial length of the first toothing region (L1) in an axial direction of the shaft-hub connection divided by an axial length of the first toothing (L) in the axial direction is greater than 0.5.

10. The motor vehicle of claim 7, wherein teeth of the second toothing region have a threading tip on an edge facing the first toothing region that includes a surface that is inclined in an axial direction of the shaft-hub connection.

11. The motor vehicle of claim 7 wherein the shaft has the first toothing and the hub has the second toothing, and the first toothing includes external toothing of the shaft and the second toothing includes internal toothing of the hub, or the first toothing includes internal toothing of the shaft and the second toothing includes external toothing of the hub.

12. The motor vehicle of claim 7 wherein the hub has the first toothing and the shaft has the second toothing, and the first toothing includes external toothing of the hub and the second toothing includes internal toothing of the shaft, or the first toothing includes internal toothing of the hub and the second toothing includes external toothing of the shaft.

\* \* \* \* \*